United States Patent [19]

Woodard

[11] Patent Number: 4,786,783

[45] Date of Patent: Nov. 22, 1988

[54] ELECTRICALLY HEATABLE LAMINATED WINDOW

[75] Inventor: Floyd E. Woodard, Olivette, Mo.

[73] Assignee: Monsanto Company, St. Louis, Mo.

[21] Appl. No.: 84,600

[22] Filed: Aug. 11, 1987

[51] Int. Cl.$^4$ .............................................. H05B 3/10
[52] U.S. Cl. .................................. 219/547; 219/203; 219/522
[58] Field of Search ............... 219/547, 522, 552, 553, 219/548, 203

[56] References Cited

U.S. PATENT DOCUMENTS

| | | | |
|---|---|---|---|
| 3,649,359 | 3/1972 | Apfel et al. | 350/164 |
| 3,679,291 | 7/1972 | Apfel et al. | 350/164 |
| 3,682,528 | 8/1972 | Apfel et al. | 350/1 |
| 3,889,026 | 6/1975 | Groth | 428/34 |
| 3,990,784 | 11/1975 | Gelber | 350/166 |
| 4,017,661 | 4/1977 | Gillery | 428/412 |
| 4,179,181 | 12/1979 | Chang | 350/1.7 |
| 4,368,945 | 1/1983 | Fujimori et al. | 350/1.7 |
| 4,465,736 | 8/1984 | Nishihara et al. | 428/322 |
| 4,639,069 | 1/1987 | Yatabe et al. | 350/1.7 |

Primary Examiner—C. L. Albritton
Attorney, Agent, or Firm—Michael J. Murphy; William J. Farrington

[57] ABSTRACT

A transparent, laminated window, particularly for use as a vehicle windshield, has improved deicing capability and high luminous transmission and near IR rejection, comprises an optical element having a low sheet resistivity of less than about 6 ohms per square and less than about 11% normal incidence reflection of 400–700 nm wavelength light, such element containing at least two transparent metal layers less than 150Å thick which are electrically conductively associated with bus bar(s) and separated by one or more dielectric layers.

8 Claims, 2 Drawing Sheets

ELECTRICALLY HEATABLE LAMINATED WINDOW

CROSS REFERENCE TO RELATED APPLICATION

"Electrically Heatable Laminated Window," Floyd E. Woodard, U.S. Serial No. 084,274.

BACKGROUND OF THE INVENTION

This invention relates to transparent laminated windows and more particularly to such windows having improved defrosting capability and a desirable balance of optical properties.

With the advent of aerodynamic motor vehicle bodies having severely sloping front and rear windows to reduce drag and conserve fuel, automobile windows are increasing in surface area with each model year. This has disadvantages in that the inside of the motor vehicle becomes quite hot in summer while in winter it takes longer to defrost or deice and defog quickly and uniformly using conventional motor vehicle generator voltages. As disclosed in U.S. Pat. No. 4,017,661, transparent laminated windows which can be electrically defrosted are known. However, the amount of heat producible with motor vehicle generated voltages in such prior art windows is limited, which disadvantageously extends the time for clearing extended surface windshields. It would be desirable to reduce the time for clearing laminated windows of ice and condensation without any significant deterioration in optical properties of the window.

SUMMARY OF THE INVENTION

Now improvements have been developed which alleviate shortcomings of the prior art and facilitate removal of ice and condensation from laminated windows.

Accordingly, a principal object of this invention is to provide an improved electrically conductive motor vehicle windshield which also has an improved combination of optical properties.

Another object is to provide a transparent, laminated window having improved resistive heating capability for removing ice and condensation from its surfaces with no color reflectance regardless of viewing angle.

A specific object is to provide an improved, electrically conductive windshield containing an optical element capable of (i) high luminous transmittance (more than 70%) and low reflected color at oblique viewing angles and (ii) significant rejection, primarily by reflection, or near infrared (IR) solar radiation to minimize heat buildup in the vehicle compartment.

Other objects of this invention will in part be obvious and will in part appear from the following description and claims.

These and other objects are accomplished by electrically connecting first and second metal layers of an optically efficient multi-layer metal/metal oxide interference filter element to a source of electric energy to decrease sheet resistivity and approximately double the power deliverable to the element (vis-a-vis one containing a single metal layer), thereby increasing electrically generated heat and reducing defrost and/or demist time. The metal layers are spaced from each other in the optical element by an amount which causes visible (i.e. luminous) light reflectance from each of the layers to destructively interfere so as to suppress undesirable luminous reflectance and enhance desirable luminous transmission of the window containing the optical element. To reduce undesirable reflected color which is generally visually evident at oblique viewing angles, the metal layers are relatively thin with the second metal layer compensating for the higher sheet resistivity occurring from the thickness reduction, thereby preserving the capability of reduced defrost time without a deterioration in visual optics.

More specifically, a transparent, laminated window is provided having improved defrosting capability and reduced oblique viewing angle color reflectance comprising: (A) an optical element having a sheet resistivity of less than about 6 ohms per square and less than about 11% normal incidence reflectance of 400–700 nm wavelength light, said element containing: (i) at least two electrically conductive metal layers, each having a thickness of less than 50 angstroms (A); (ii) one or more dielectric spacing layers separating such conductive layers; and (iii) a transparent substrate; and (B) a bus bar electrically conductively associated with each conductive layer.

BRIEF DESCRIPTION OF THE DRAWING

In describing the overall invention, reference will be made to the accompanying drawing wherein.

DETAILED DESCRIPTION OF THE INVENTION

Figure 1:
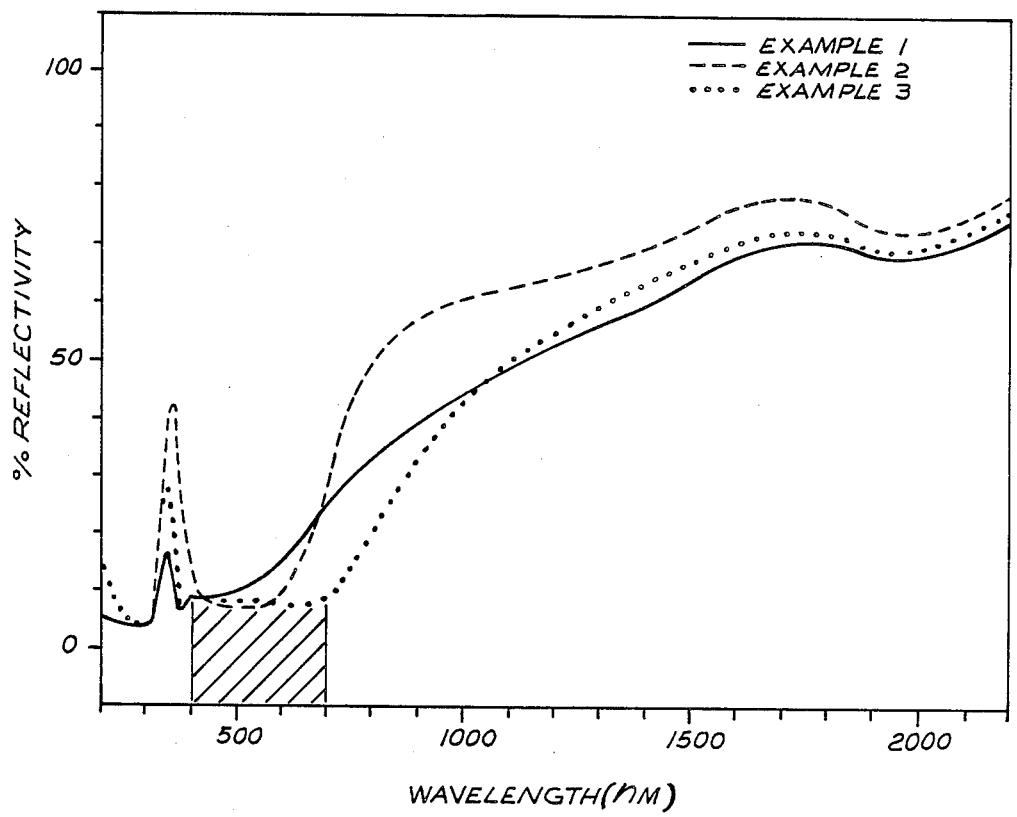
FIG. 1 is a normal incidence plot illustrating graphically the actual measured reflectivity of transparent laminates employing various thicknesses of single and dual silver metal layers.

The optical element component of the laminated window of the invention is an interference filter of the Fabry-Perout type designed, principally through the appropriate selection of materials and their thicknesses, to maximize (i) transmission of visual or luminous radiation and (ii) reflection of infrared portions (700–2125 nm) of the solar spectrum. Such element consists of multiple, sequentially deposited planar layers of angstroms-thick metal and dielectric coatings arranged in a predetermined sequence in face-adhering, contiguous contact with each other, of the type generally disclosed in U.S. Pat. Nos. 3,682,528 and 4,179,181.

The inventive optical element must contain at least two electrically conductive, near IR reflecting metal layers which, when operatively positioned in the element, result in a transmission of at least 70% visible light of normal incidence measured as specified in ANSI Z26.1, this being the minimum required in the U.S. automotive industry. Preferably visible light reflectance, normal from the surface of the element is less than 16%. The metal layers of the optical element must be separated (i.e. vertically in the thickness direction) from each other by one or more dielectric layers conventionally used in interference filters so that reflection of visible light from the two adjacent separated metal layers interferes destructively thereby enhancing visible transmission. Usable metals comprise silver, aluminum, chrome, nickel, brass, gold, stainless steel, copper, and alloys or claddings of any of the foregoing. The preferred metal for each of the layers is silver.

Each metal layer should be continuous and highly conductive to maximize reduction in thawing periods without deterioration in the visible light transmission and near infrared solar rejection properties of the element. Reduced thawing time is achieved by using the second metal layer (though more than two may be present and each may be used) along with the first metal layer to conduct an electric current as a means for heating the window to melt frost or ice from its outer surface. The rapidity at which an applied voltage can defrost a window is determined by the sheet resistivity of the optical element. This is the resistance measured between bus bars extending across opposite sides of a square element. Since vehicle windshields approximate a 2 by 1 rectangle, the actual bus to bus resistance will be equal to approximately one half of the sheet resistivity. The sheet resistivity of the optical element of the invention should not exceed about 6 and preferably be less than about 3 ohms per square which, in the latter instance, it is estimated, should provide a defrost time of less than two minutes at 0° F. Even slight metal layer discontinuity drastically decreases electrical conductivity and luminous transmittance.

As metal layer thickness is reduced, visual light reflectance, considered a driving safety hazard if excessive, is likewise desirably reduced. However, as metal layer thickness decreases, sheet resistivity and therefore defrost time increases. In the present invention, the metal layers are relatively thin to minimize such visual reflection and, importantly, the presence of the second conductive metal layer is used to advantage to keep sheet resistivity of the optical element relatively low to minimize defrost time. To achieve this balance in optical and defrost properties, the metal film should have a thickness of between 60 to 150, preferably 80 to 140 and most preferably 100 to 130 angstroms. For maximum reflection attenuation, reflection from two metal layers should be equal and this is best achieved by having the thickness and composition of each layer identical.

The dielectric layer(s) of the optical element must be essentially transparent over the solar range (i.e. from 325 to 2125 nm) and at least one must exist between each pair of electrically conductive metal layers. Preferably, a dielectric layer is positioned on each side of a metal layer. Exemplary usable dielectric materials include $SiO$, $SiO_2$, $Ta_2O_5$, $WO_3$, $In_2O_3$ ... $SnO_2$, $Al_2O_3$, $In_2O_3$, $MgF_2$, $ZnS$, and $ZnO_2$; $TiO_2$ is preferred for each dielectric layer.

Figure 2:
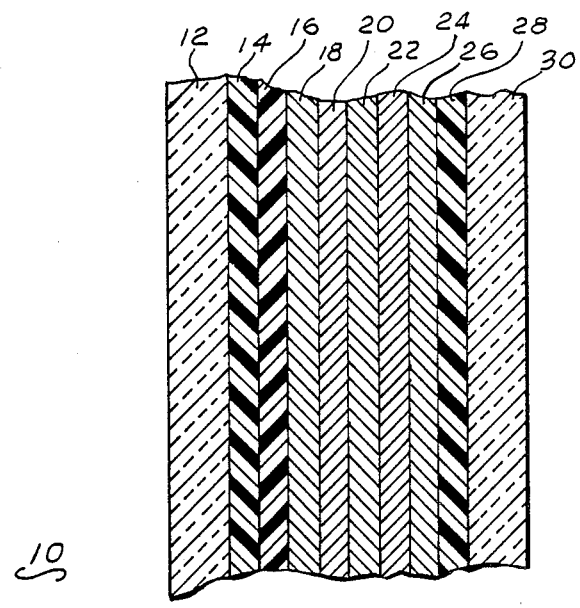
FIG. 2 is a schematic, partial cross-sectional view showing a typical multi-layered laminate according to the invention.

The substrate of the optical element comprises one or plural layers, one of which directly supports the optical element in that a layer of the latter rests in face to face contact on the substrate surface. The substrate can be selected from a variety of materials with choice generally governed by the compatability between the optical element and the substrate. Usable substrates should not be prone to stretch to avoid cracking the metal/dielectric layers and should be free of excess amounts of volatiles such as plasticizers, water vapor or absorbed gases. The dielectric layer of the optical element in direct contact with the substrate should adhere well to the substrate surface. Generally the optical element of the invention adheres well to glass, ceramics and certain flexible plastics such as polyesters, cast acrylics, polycarbonates, chlorinated plastics and epoxies. Polyurethanes and polyvinyl butyral as a substrate component in direct supportive contact with the optical element are too soft and extensible. Preferred substrates are sheets of transparent materials such as glass or non-extensible flexible plastic materials such as linear polyesters, e.g. polyethylene terephthalate which is commercially available as Mylar®. In a preferred construction the optical element is sequentially deposited on a flexible sheet substrate of polyethylene terephthalate (PET), and then the substrate carrying the optical element is encapsulated within two layers of conventional plasticized polyvinyl butyral (PVB), one layer of which abuts the PET substrate and the other abuts the top layer of the optical element. The multi-layered "sandwich" containing PVB as the outer layers is then conventionally laminated between two rigid members such as glass panes, or alternatively may be used as a bilayer structure by laminating it to one such rigid member intended to be the exterior side of a window. Such a multi-layered structure 10 is shown in FIG. 2 and comprises glass layers 12, 30, polyvinyl butyral layers 14, 28, PET layer 16, metal oxide layers 18, 22 and 26 and silver layers of a vehicle windshield 32 having bus bars 34, 36 electrically associated with silver layers 20 and 24. Besides glass, other rigid transparent sheets such as polycarbonate and acrylic are usable. Lamination must not significantly affect the electrical conductivity of the optical element, nor reduce the visible light transmission or near IR reflectance by more than about 8%. For motor vehicle window applications the flexible plastic substrate sheet of the sandwich referred to above should have a thickness of about 1 to about 8 mils, the individual sheets of plasticized PVB should be about 5 to about 60 mils thick and the rigid transparent member should be from 60 to 500 mils thick.

As generally known in the art, varying the thickness and composition of a dielectric layer spaced between two reflecting metal layers, will also vary the optical transmittance/reflection properties of the optical element considerably. More specifically, varying the thickness of the spacing dielectric layer varies the wave length associated with the reflection suppression (or transmission enhancement) band. Generally, the thickness of spacing dielectric layer(s) should be between about 200 to about 1200 and preferably between 450 to 1000 angstroms to obtain the desired optical properties and film continuity necessary for a commercially acceptable product. Metal oxide dielectric layers less than about 200 or more than about 1200 angstroms result in very low luminous transmittance.

Exterior dielectric layers in contact with the metal layer surfaces opposite to the metal surfaces contacting spacing dielectric layer(s) are preferably used to enhance anti-reflection performance. Exterior dielectric layers generally should have a higher refractive index than glass or polyvinyl butyral, i.e. greater than 1.5 and preferably greater than 1.8. The thickness of such exterior or outside dielectric layer(s) is generally less than the spacing dielectric layer(s) and should be about 100 to about 600 and preferably 140 to 500 angstroms.

Individual layers of the optical element are deposited by vacuum coating techniques well known in the art such as vacuum evaporation or sputtering. Usable methods include evaporation (resistance heated, laser heated, or electron-beam vaporization) and sputtering (diode or magnetron) under normal or reactive conditions.

The laminated window of the invention can be used in any application requiring a transparent resistance-heated window. The preferable environment is where fast deice or thaw intervals and good near IR rejection and luminous transmission of solar radiation is desired. Typical applications include automotive windshields and architectural applications such as commercial and residential buildings.

The invention is further described with reference to the following examples which are for illustration only and are not intended to imply any limitation or restriction on the invention.

All samples described in the Examples were prepared on 5 cm square 3 mm thick glass plate substrates. Prior to coating, i.e. deposition of the optical element thereon, each glass plate was mechanically washed in detergent solution then rinsed and immersed in a 50/50 volume % solution of concentrated sulfuric acid and 30% hydrogen peroxide. After removal the plates were sequentially rinsed in distilled water and isopropanol, blown dry with nitrogen and placed in a vacuum chamber. After pumping the chamber to a base pressure less than $1\times10^{-5}$ mbar, argon was introduced at a flow of 30 sccm to give a pressure of $3\times10^{-3}$ m bar. The glass substrates were rf etched (13.56 MHz, the resulting dc voltage was 200 volts) for 10 minutes.

All vapor deposited coatings or layers were sequentially applied seriatim, one on top of the other, by magnetron sputtering using a Leybold Heraeus sputter coater, the first layer being deposited on the glass plate surface. Titanium oxide and tungsten oxide were reactively prepared using round metallic targets which had a diameter of about 7.5 cm and an area of about 44 square centimeters. Layer thicknesses were monitored using an Inficon XTC crystal monitor.

Optical properties before and after lamination were determined with a Perkin Elmer 330 UV/VIS/NIR spectrophotometer. When reflectance measurements were made the optical element, i.e. the glass plate containing the coating layers, was placed nearest the integrating sphere. Laminates were prepared with the outer vapor deposited layer in face to face contact with a PVB interlayer in the form of 30 mil thick Saflex® sheet. The sequential layers of a laminate were: optical element (i.e. coated glass substrate) /PVB/glass. In preparing a laminate, the coated glass /PVB/glass stack was preheated at 150° C. for 15 min. and a pressure of 40 psi applied for 5 min. while maintaining such temperature. With the pressure maintained the laminate was then allowed to cool to room temperature.

Sheet resistivities were measured with an Alessi Model A4P series four point probe using a 3 volt power supply.

Abbreviations used in data in the Examples are defined as follows:

Tv, Rv and Av=respectively, visible transmission, reflectance and absorption

Ts, Rs and As=respectively, solar transmission, reflectance and absorption

SR=solar energy rejection calculated under standard summer conditions specified in ASHRAE Handbook, 1985, chapter 27—i.e. % SR=100%-%Ts—0.27 x %As RES=sheet resistivity in ohms per square WO3=tungsten oxide A=angstroms Exampees labeled "LAM" represent laminated samples while those without such designation were unlaminated—i.e. were only the glass substrate-multilayer coating combination per se.

EXAMPLES 1-3

Optical elements containing single (Example 1 and dual (Examples 2 and 3) silver metal layers of various thicknesses and with dielectric layers on each side of a metal layer were prepared. Examples 1 and 2 are not according to the invention whereas Example 3 is. Deposition conditions and recipes were as follows:

| Ex. | Film Comp. | Flow Rate Argon sccm | Flow Rate Oxygen sccm | Total Press. mmbar | DC Power Watts | Film Thickness A | Deposition Rate A/sec. |
| --- | --- | --- | --- | --- | --- | --- | --- |
| 1 | TiO2 | 30 | 12.0 | 3.5 | 350 | 283 | 1.5 |
|   | Ag | 30 | — | 3 | 44 | 180 | 20 |
|   | WO3 | 30 | 1.0 | 3 | 18 | 60 | 1.0 |
|   | TiO2 | 30 | 12.0 | 3.5 | 350 | 249 | 1.5 |
| 2 | TiO2 | 30 | 12.0 | 3.5 | 350 | 283 | 1.4 |
|   | Ag | 30 | — | 3 | 44 | 180 | 20 |
|   | WO3 | 30 | 1.0 | 3 | 18 | 60 | 1.0 |
|   | TiO2 | 30 | 12.0 | 3.5 | 350 | 576 | 1.5 |
|   | Ag | 30 | — | 3 | 44 | 180 | 20 |
|   | WO3 | 30 | 1.0 | 3 | 18 | 60 | 1.0 |
|   | TiO2 | 30 | 12.0 | 3.5 | 350 | 249 | 1.4 |
| 3 | TiO2 | 30 | 12.0 | 3.5 | 350 | 283 | 1.4 |
|   | Ag | 30 | — | 3 | 44 | 120 | 20 |
|   | WO3 | 30 | 1.0 | 3 | 18 | 60 | 1.0 |
|   | TiO2 | 30 | 12.0 | 3.5 | 350 | 576 | 1.5 |
|   | Ag | 30 | — | 3 | 44 | 120 | 20 |
|   | WO3 | 30 | 1.0 | 3 | 18 | 60 | 1.0 |
|   | TiO2 | 30 | 12.0 | 3.5 | 350 | 249 | 1.4 |

Performance data obtained on each sample is given in the following Table I.

TABLE 1

| Example | Ag Thickness (A) | % Tv | % Rv | % Av | % Ts | % Rs | % As | % SR | RES |
| --- | --- | --- | --- | --- | --- | --- | --- | --- | --- |
| 1 | 180 | 84.2 | 6.3 | 9.4 | 53.8 | 37.4 | 8.8 | 44 | 3.18 |
| LAM1 |  | 76.6 | 11.4 | 11.9 | 48.2 | 29.2 | 22.5 | 46 |  |
| 2 | 180 | 76.4 | 4.9 | 18.5 | 39.8 | 43.3 | 16.1 | 56 | 1.79 |
| LAM2 |  | 72.9 | 7.4 | 19.8 | 37.2 | 36.0 | 26.9 | 56 |  |
| 3 | 120 | 75.5 | 6.7 | 17.8 | 50.3 | 30.7 | 19.0 | 45 | 2.98 |

TABLE 1-continued

| Example | Ag Thickness (A) | % Tv | % Rv | % Av | % Ts | % Rs | % As | % SR | RES |
|---|---|---|---|---|---|---|---|---|---|
| LAM3 | | 71.6 | 7.0 | 21.4 | 45.4 | 23.8 | 30.8 | 46 | |

Reflected light of various colors at oblique viewing angles was visually observed from the surfaces of LAM1 and LAM2 but no reflected color regardless of viewing angle could be observed from LAM3.

A characteristic of multi-layer optical elements containing defrosting metal layers is that they become more reflective when viewed at oblique angles. This is because the anti-reflection notch arising from destructive interference between reflections from various interfaces moves to shorter wavelengths when light approaches the element from oblique angles. In the drawing, Example 3 (i.e. the invention illustrates performance of an optical element containing dual 120A thick silver layers which has an exceptionally wide reflection suppression notch (i.e. the wave-length range where luminuous reflection is below about 11%) in comparison with that for Examples 1 and 2, and this wide notch prevents reflected color regardless of viewing angle. More specifically, this capability is depicted in the drawing for Example 3 as circumscribed by the cross-hatched area and is considered to be defined as possessing less than about 11% normal incidence reflection at all wavelengths between 400 and 700 nm. This is to be contrasted with the reflection performance of Example 1 (single metal layer) and Example 2 (dual metal layers of 180A thickness) in the drawing where reflection increases and well exceeds 11% within the 400-700 nm visible light region. This suppression of reflected color is achieved while retaining (Table 1) sheet resistivity at about 3 and luminous transmission in excess of 70%.

While certain specific embodiments of the invention have been described with particularity herein, it will be recognized that various modifications thereof will occur to those skilled in the art. The scope of the invention, therefore, is to be limited solely by the scope of the following claims.

I claim:

1. A transparent, laminated window having improved defrosting capability and reduced oblique viewing angle color reflectance comprising:
(A) an optical element having a sheet resistivity less than about 6 ohms per square and less than about 11% normal incidence reflection of at any wavelength between 400 and 700 nm, containing:
  (i) at least two transparent, electrically conductive layers, each having a thickness of less than 150 angstroms;
  (ii) at least one dielectric layer between said conductive layers;
  (iii) a transparent substrate; and
(B) a bus bar electrically conductively associated with each conductive layer.

2. The window of claim 1 wherein sheet resistivity is less than about 3 ohms per square.

3. The window of claim 1 wherein the thickness of each conductive layer is between 60 and 150 angstroms.

4. The window of any of claims 1, 2 or 3 wherein each conductive layer is silver.

5. The window of claim 4 wherein the dielectric layers are titanium dioxide.

6. The window of claim 5 including flexible plastic layers within which the optical element is encapsulated.

7. The window of claim 6 wherein the flexible plastic comprises polyvinyl butyral.

8. A transparent, laminated window capable of transmitting at least 70% of visible light and having improved defrosting capability and reduced oblique viewing angle color reflectance comprising:
(A) an optical element having a sheet resistivity less than about 3 ohms per square and less than 11% normal incidence reflection at any wavelength between 400 and 700 nm light, said optical element comprising:
  (i) at least two silver layers, each having a thickness of 100-130 angstroms;
  (ii) at least one dielectric layer between said silver layers;
  (iii) at least one dielectric layer against the exterior surfaces of the silver layers opposite to those in contact with the layers of (ii);
  (iv) a transparent substrate; and
(B) a bus bar electrically conductively associated with each silver layer.

* * * * *

UNITED STATES PATENT AND TRADEMARK OFFICE
CERTIFICATE OF CORRECTION

PATENT NO. : 4,786,783

DATED : November 22, 1988

INVENTOR(S) : Floyd E. Woodward

It is certified that error appears in the above-identified patent and that said Letters Patent is hereby corrected as shown below:

Column 4, line 18, after "layers" second occurrence, insert -- 20 and 24.--.

line 18, delete "of".

Figure 3:
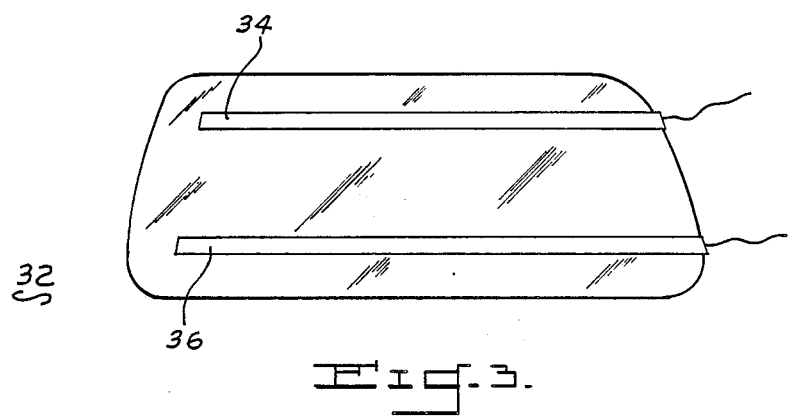
FIG. 3 is a view taken at 90 degrees to FIG. 2.

Column 4, line 19, insert -- Fig. 3 depicts the window of Fig. 2 in the form of --.

Signed and Sealed this

Ninth Day of May, 1989

Attest:

DONALD J. QUIGG

Attesting Officer     Commissioner of Patents and Trademarks